US005906744A

United States Patent [19]

Carroll et al.

[11] Patent Number: 5,906,744

[45] Date of Patent: May 25, 1999

[54] TUBE FOR PREPARING A PLASMA SPECIMEN FOR DIAGNOSTIC ASSAYS AND METHOD OF MAKING THEREOF

[75] Inventors: Richard J. Carroll, Syracuse, N.Y.; Frank A. Augello, Cedar Knolls, N.J.

[73] Assignee: Becton Dickinson and Company, Franklin Lakes, N.J.

[21] Appl. No.: 08/925,851

[22] Filed: Sep. 9, 1997

Related U.S. Application Data

[63] Continuation-in-part of application No. 08/893,106, Jul. 15, 1997, abandoned

[60] Provisional application No. 60/045,193, Apr. 30, 1997.

[51] Int. Cl.[6] .......... B01D 21/26

[52] U.S. Cl. .......... 210/516; 210/518; 210/789; 422/101; 422/102; 435/2

[58] Field of Search .......... 210/782, 789, 210/516, 518; 435/2; 422/101, 102

[56] References Cited

U.S. PATENT DOCUMENTS

| | | | |
|---|---|---|---|
| 3,847,738 | 11/1974 | Brake et al. | 195/1.8 |
| 4,069,185 | 1/1978 | Sullivan | 523/112 |
| 4,356,172 | 10/1982 | Nakao et al. | 424/101 |
| 4,500,309 | 2/1985 | Deiderich et al. | 604/5 |
| 4,695,460 | 9/1987 | Holme | 424/101 |
| 4,798,577 | 1/1989 | Brenneman et al. | 494/67 |
| 4,816,168 | 3/1989 | Carrol et al. | 210/782 |
| 4,867,887 | 9/1989 | Smith | 210/782 |
| 4,957,638 | 9/1990 | Smith | 210/782 |
| 4,961,928 | 10/1990 | Holme et al. | 424/533 |
| 4,985,026 | 1/1991 | Kasai et al. | 604/403 |
| 5,213,765 | 5/1993 | Kasai et al. | 422/101 |
| 5,248,506 | 9/1993 | Holme et al. | 424/533 |
| 5,667,963 | 9/1997 | Smith et al. | 435/2 |

OTHER PUBLICATIONS

"Recognition and Prevention of Pseudothrombocytopenia and Concomitant Psedolekocytosis", A.J.P.F. Lombarts, Ph.D., W. DeKieviet, Ph.D., Oct. 14, 1987, pp. 634–639.

"Influence of blood withdrawal and anticoagulant on clotting activity, hematologic data, and certain rheologic measurements", W.H. Reinhart, A. Haeberli, J. Stark and P.W. Straub, *J. Lab Clin Med,* vol. 115, No. 1, pp. 98–103.

"Collection and Preparation of Hematopoietic Cells for Cell Marker Analysis", C.W. Patrick, Ph.D., S.J. Swartz, BD, K.A. Harrison, BS and R.H. Keller, MD, FACP, *Laboratory Medicine,* vol. 15, No. 10, Oct. 1984, pp. 659–665.

"Blood Storage and Shipment", *AABB Technical Manual,* Chapter 5, pp. 54–57. (Undated).

"Effects of Storage Condition on Lymphocyte Phenotypes from Healthy and Diseased Persons", C.H. Miller, N.B. Levy, *Journal of Clinical Laboratory Analysis,* 3 (1989), pp. 296–300.

"An Improved Clonal Excess Assay Using Flow Cytometry and B–Cell Gating", B.W. Letwin, P.K. Wallace, K.A. Murhead, G.L. Hensier, W.H. Kashatus and P.K. Horan, *Blood,* vol. 75, No. 5, Mar. 1, 1990, pp. 1178–1185.

*Primary Examiner*—John Kim
*Attorney, Agent, or Firm*—Nanette S. Thomas, Esq.

[57] ABSTRACT

A collection device for plasma preparation for diagnostic assays. The device comprises a spray-dried anticoagulant formulation on the interior surface of the device and a thixotropic polymeric gel. The device is an improvement over commercially available devices which contain liquid anticoagulant formulations, for use in nucleic acid testing that employ amplifications technologies including, but not limited to, polymerase chain reaction (PCR), branched DNA (bDNA) and nucleic acid sequenced based amplification (NASBA).

3 Claims, 2 Drawing Sheets

TUBE FOR PREPARING A PLASMA SPECIMEN FOR DIAGNOSTIC ASSAYS AND METHOD OF MAKING THEREOF

This is a continuation-in-part of U.S. Ser. No. 08/893, 106, filed on Jul. 15, 1997, which is abandoned and claims priority to provisional U.S. Ser. No. 60/045,193, filed on Apr. 30, 1997.

BACKGROUND OF THE INVENTION

1. Field of the Invention

This invention relates to a device for blood plasma preparation for a variety of analytical assays. More particularly, the present invention pertains to a blood collection device comprising a thixotropic polymeric polyester gel and an anticoagulant formation. The device of the present invention is most preferably used in nucleic acid testing, which use amplification technologies including, but not limited to, polymerase chain reaction (PCR), branched DNA (bDNA) and nucleic acid sequence based amplification (NASBA).

2. Description of Related Art

New amplification technologies, such as polymerase chain reaction (PCR), branched DNA (bDNA), and nucleic acid sequence based amplification (NASBA), allow researchers to monitor the levels of infectious agents in plasma. Studies have demonstrated that the number of extracellular HIV RNA viral copies, or viral load, is a surrogate marker for the progression of the HIV infection. Scientific research has shown that HIV replication occurs throughout the life of the infection. After the initial infection, the HIV viron enters susceptible cells, replicates rapidly creating billions of copies of the HIV viral RNA soon after infection. Although the HIV RNA viral load varies across the patient population, the disease follows a specific progressive pattern within each patient. Therefore, monitoring the HIV RNA viral load of HIV infected patients can be used to manage the disease. In addition, the patients' response to approved drugs, new drugs and combination drug therapies can be evaluated by monitoring the patient's HIV RNA viral load.

In addition to the HIV virus, there are a number of other infectious diseases that would benefit from viral load monitoring, such as the Hepatitis C virus.

Measurements of the viral load are determined by using polymerase chain reaction (PCR), branched DNA (bDNA), and other amplification techniques. The quality and consistency of the sample is critical to obtaining optimal test results using these technologies. There are a number of variables that influence the sample quality, such as the collection method, centrifugation time, sample preparation technique, transport to the test laboratory, contamination with cellular materials, and the like.

Numerous sample types have been evaluated for nucleic acid testing, including whole blood, serum and plasma. Studies have shown that the HIV viral load is stable for up to 30 hours in a whole blood sample using EDTA as the anitcoagulant. The clotting process required to produce serum can artificially lower the viral load by trapping viral particles in the resulting clot. Although the preferred sample type is plasma, the preparation of a plasma sample may adversely affect the outcome of the amplification process. For example, if the plasma sample remains in contact with the red blood cells, heme molecules from the hemoglobin contained within red blood cells will interfere with PCR amplification if hemolysis occurs. In addition, since the half-life of the neutrophils is approximately 24 hours in a blood collection tube, and as the neutrophils begin to die they release granules which contain myeloperoxidase into the sample, and since myeloperoxidase causes reduction in the viral load, this is also another factor that supports the need to sequester the plasma sample away from blood cells.

A further example of the difficulties associated with current plasma preparation is the fact that blood collection tubes may contain a liquid anticoagulant to prevent clotting of the sample. A liquid anticoagulant may dilute the viral load value per volume of sample. Therefore, the viral load value may be below the threshold of detection.

Commercially available blood collection products such as (all sold by Becton Dickinson and Company, Franklin Lakes, N.J. and all registrations and trademarks are of Becton Dickinson and Company) VACUTAINER Brand Hematology tubes, Catalog nos. 367650-1, 367661, 6405, 6385, 6564, 367653, 367665, 367658, 367669, 6450-8, 6535-37, 367662; VACUTAINER Brand $K_2$EDTA tubes catalog no. 367841-2, 367856, 367861; VACUTAINER Brand PST tubes catalog nos. 367793-4, 6698, 6595, 6672; VACUTAINER Brand CPT tubes catalog nos. 362753, 362760-1; VACUTAINER Brand SST tubes catalog nos. 367782-89, 6509-17, 6590-92; and VACUTAINER Brand ACD tubes catalog nos. 367756, 364012, 4816; may be used for nucleic acid testing. However, these commerically available products may not consistently provide a sample of good integrity and therefore may not provide consistent and adequate amplification results.

Therefore, a need exists to provide a standard device designed to collect, process, and transport plasma samples for use with amplification technologies. Most preferably, the device should be able to assist in standardizing specimen handling, provide a closed system, isolate the plasma from the cellular components, produce minimal plasma dilution, and minimize interference with the nucleic acid testing.

SUMMARY OF THE INVENTION

The present invention is a device for preparing a plasma specimen suitable for diagnostic assays, such as nucleic acid testing. The device comprises a plastic or glass tube, a means for inhibiting blood coagulation, and a means for separating plasma from whole blood. The device preferably further comprises a means for dosing the tube to seal a vacuum within the tube, and for providing easy access into the tube.

Preferably, the means for inhibiting blood coagulation is an anticoagulant formulation.

Desirably, the anticoagulant formulation comprises a mixture of water, ethylenediaminetetraacetic acid dipotassium salt dihydrate, also known collectively as $K_2$EDTA or alternatively, ethylenediaminetetraacetic acid tripotassium salt dihydrate, also known collectively as $K_3$EDTA. Most preferably, the anticoagulant formulation comprises $K_2$EDTA having a chemical composition of $2(CH_2COOK)—C_2—N_2—H_4—2(CH_2COOH)—2(H_2O)$.

Most preferably, the $K_2$EDTA formulation is spray dried over a large surface area of the inner wall of the tube to substantially reduce the local osmolality and concentration gradients between the anticoagulant and cells of the blood sample, thereby substantially minimizing the possibility of hemolysis and cell rupture within the blood sample.

Preferably, the means for separating plasma from whole blood is a gel formulation. The gel is desirably a thixotropic polymeric gel formulation. The gel desirably isolates the plasma from the cells of the blood sample in the tube by serving as a density separation medium. As the sample is centrifuged, the gel moves to a point dividing the heavier cellular materials and the lighter plasma fraction of the blood sample. In other words, the plasma of the blood sample is partitioned above the gel and separated from the remainder of the blood.

Most preferably, the tube comprises the gel positioned at the bottom end of the tube and the anticoagulant formulation is then spray-dried onto the interior of the tube above the gel.

The device of the present invention is useful in molecular diagnostic applications, including but not limited to nucleic acid testing, RNA and DNA detection and quantification, using amplification methods. Accordingly, the present invention provides an improved method for handling and preparing plasma samples for nucleic acid testing, because the separation of the plasma from the whole blood can be accomplished at the point of collection and may minimize any changes or degradation of the nucleic acid.

The device of the present invention provides a one-step closed system for collecting blood, separating plasma, and transporting a specimen for nucleic acid testing. The device substantially maximizes the capabilities of PCR, bDNA, NASBA or other amplification techniques, by providing a substantially consistent sample, whereby test-to-test variability due to sample quality and variation may be minimized and standardization of sample handling may be facilitated.

In addition, the device of the present invention provides an isolated specimen that is protected when prompt centrifugation at the point of collection is employed and the stability of the specimen is improved during transport. Additional attributes of the device of the present invention are that a spray-dried anticoagulant formulation, which provides a substantially stable blood-to-additive ratio over the shelf life of the tube, whereby the device substantially isolates plasma from cells and substantially minimizes sample degradation due to the neutrophils and red blood cells.

Most notably is that the device of the present invention provides a closed system for collecting a blood specimen; means for anticoagulating the blood without any substantial dilution; means for facilitating separation of the plasma from the remainder of the whole blood by a gel barrier; means for freezing the plasma within the device; and means for transporting the specimen to an analytical site while maintaining sample quality and integrity. Therefore the device of the present invention provides the means to derive an undiluted plasma within a closed-system configuration with minimal test-to-test variations as compared to commercially available devices.

Important attributes of the device of the present invention are that it is (i) compatible with the molecular technologies that are used for nucleic acid testing; (ii) provides a substantially pure plasma specimen with substantially less cellular contamination as compared to devices that have no gel barrier and (iii) allows for an undiluted plasma specimen which enhances the sensitivity of various molecular technologies, especially for specimens with a low viral titer.

DETAILED DESCRIPTION

The present invention may be embodied in other specific forms and is not limited to any specific embodiments described in detail, which are merely exemplary. Various other modifications will be apparent to and readily made by those skilled in the art without departing from the scope and spirit of the invention. The scope of the invention will be measured by the appended claims and their equivalents.

The device of the present invention preferably comprises a spray-dried anticoagulant formulation and a gel. The device of the present invention is most preferably a blood collection device and may be either an evacuated blood collection device or a non-evacuated blood collection device. The blood collection device is desirably made of plastic, such as but not limited to polyethylene terephthalate, or polypropylene, or glass.

Figure 1:
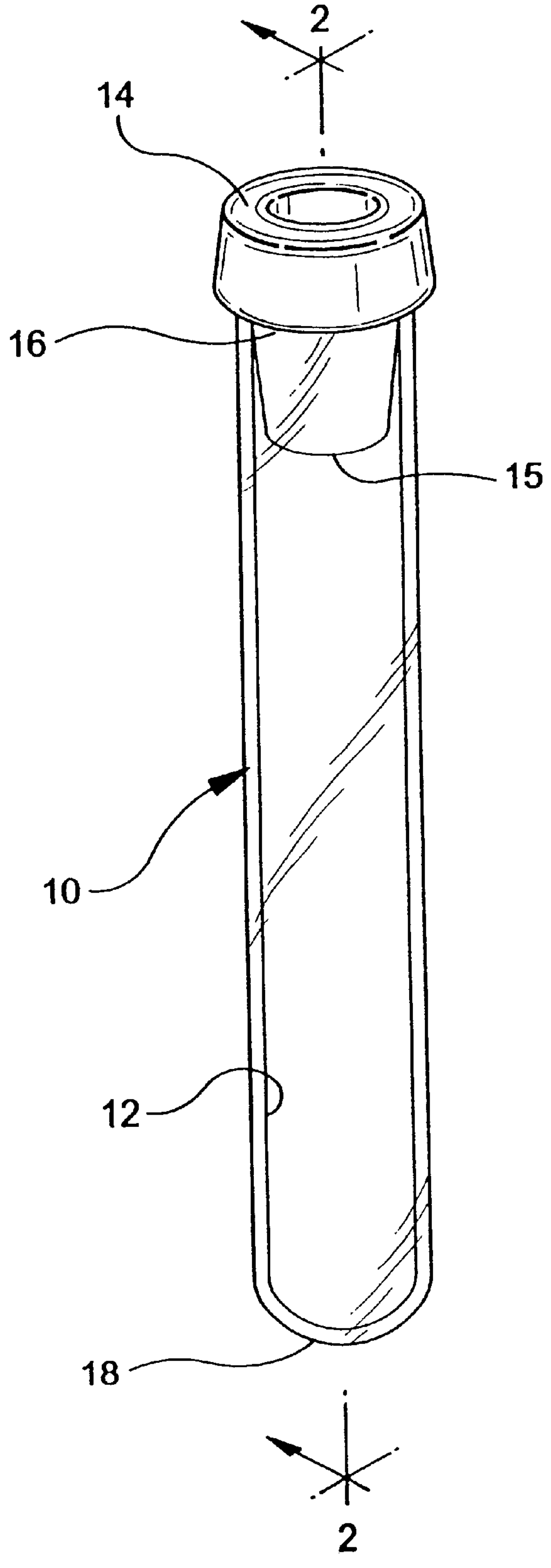
FIG. 1 is a perspective view of a typical blood collection tube with a stopper.

Referring to the drawings in which like reference characters refer to like parts throughout the several views thereof, FIG. 1 shows a typical blood collection device 10, having an open end 16, a closed end 18, inner wall 12, and a stopper 14 that includes a lower annular portion or skirt 15 which extends into and presses against the inner wall 12 of the tube for maintaining stopper 14 in place.

Figure 2:
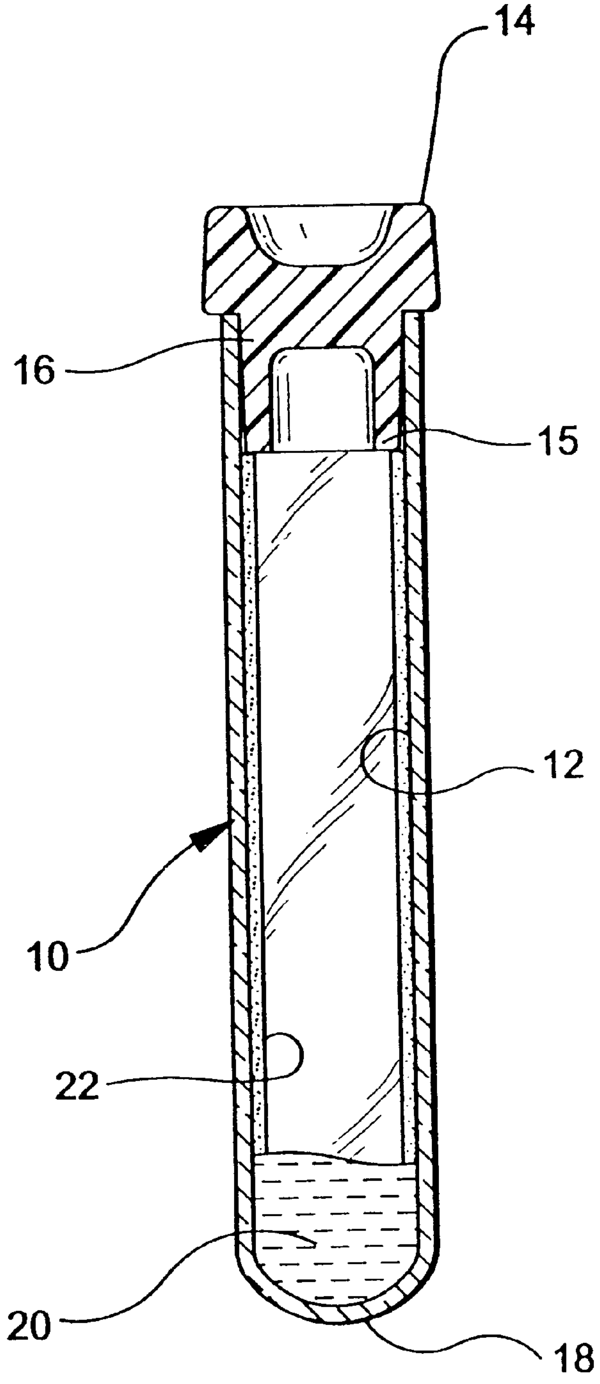
FIG. 2 is a longitudinal section view of the tube of FIG. 1 taken along line 2—2, comprising the spray dried anticoagulant formulation and the gel of the present invention.

FIG. 2 shows device 10 with a gel 20 and above the gel along inner wall 12 is an anticoagulant coating 22.

A blood specimen sample of interest can be transferred into device 10, wherein the specimen contacts the anticoagulant formulation so that the anticoagulant formulation rapidly dissolves into the specimen and clotting of the specimen is minimized.

After blood is collected in the device of the present invention, a cascade reaction may occur that causes the blood to clot. Anticoagulants are materials that are used to prevent the clotting of blood by blocking the cascade mechanism that causes clotting. To collect a plasma sample from whole blood, an anticoagulant must be added immediately to preserve the integrity of the sample. There are commercially available tubes for plasma collection that contain numerous types of anticoagulants, such as sodium citrate, heparin, potassium EDTA and the like. The selection of the type of anticoagulant is important because some additives may interfere with bDNA, PCR, or other amplification techniques used in nucleic acid testing. For example, heparin may interfere with PCR amplification.

Preferably, the anticoagulant formulation of the present invention comprises a mixture of water, ethylenediaminetetraacetic acid dipotassium salt dihydrate, also know collectively as $K_2$EDTA.

The concentration of the anticoagulant formulation is substantially sufficient for minimizing coagulation of a blood specimen sample. Desirably, the concentration of $K_2$EDTA is from about 0.2M to about 1.0M, preferably from about 0.2M to about 0.5M and most preferably from about 0.3M to about 0.4M.

The anticoagulant formulation desirably has a pH ranging from about 5.6 to about 6.2, and preferably from about 5.8 to about 6.2.

The anticoagulant formulation of the present invention may include, additional reagents in order to provide additional properties to the device.

A variety of tube coatings or the addition of other compounds to the anticoagulant formulation may be desirable. Such things include but are not limited to silicone oils and silicone surfactants.

Preferably, the gel is a thixotropic polymeric gel. The gel preferably has a specific gravity from about 1.040 to about 1.080 g/cm$^3$, and most preferably from about 1.043 to about 1.050 g/cm$^3$, so that after centrifugation, the plasma of the blood sample is partitioned above the gel and separated from the remainder of the whole blood.

The thixotropic polymeric gel is substantially water insoluble and substantially chemically inert in blood. The gel may be formulated from dimethyl polysiloxane or polyester and a precipitated methylated silica, wherein the methylation renders the material partially hydrophobic.

The thixotropic polymer gel is first deposited into a tube at the closed end, then the anticoagulant formulation of $K_2$EDTA and water is applied onto the inner wall of the tube above the gel in the form of fine mist by spray coating. The applied formulation is then dried by air jet or forced air at an elevated temperature for a period of time. Thereafter, the tube is assembled with a closure and a vacuum is formed inside the tube. The device is then sterilized by gamma irradiation or the like.

The main advantages of a tube with a spray coated anticoagulant formulation on the inner wall are more precise, stable and uniform anticoagulant fill and improved anticoagulant dissolution into the specimen. Because of the fine mist of the anticoagulant formulation, the actual surface area of anticoagulant formulation exposed to the specimen is maximized.

The method for preparing the device of the present invention comprises:

(a) depositing a gel into the closed end of a tube;

(b) preparing an anticoagulant formulation comprising a mixture of water, ethylenediaminetetraacetic acid dipotassium salt dihydrate at a concentration from about 0.2M to about 1.0M and a pH from about 5.6 to about 6.2;

(c) applying the anticoagulant formulation to the inner wall surface of the tube with a means that produces a fine mist of the formulation above the gel; and (d) drying the applied formulation by applying an air jet or forced air to the inner wall of the coated tube at an elevated temperature for a period of time.

It is preferable that the anticoagulant formulation is metered and dispensed by a volumetric type device, such as a positive displacement pump. The solution concentration (amount of anticoagulant per unit volume of formulation) is tailored with the dispense volume so that the desired amount of anticoagulant is dispensed into the device. Other spraying techniques include ultrasonic spraying.

The device of the present invention may be used to collect and prepare a specimen for nucleic acid testing as follows:

(a) collecting a specimen such as a whole blood sample or a pretreated cell fraction of blood into the prepared tube;

(b) mixing the specimen in the tube with the anticoagulant solution by manual inversion;

(c) centrifuging the tube to induce separation of plasma from the red and white blood cells and platelets so that the gel migrates to a point intermediate to the denser white and red blood cells and platelets and the less dense plasma fraction of the blood sample, thereby facilitating isolation and subsequent removal of the plasma.

Various other modifications will be apparent to and may be readily made by those skilled in the art without departing from the scope and spirit of the invention.

What is claimed is:

1. A tube for preparing a plasma specimen for diagnostic assays, comprising:

a top end and a bottom end, a side wall extending from said top end to said bottom end and including inner and outer surfaces, a thixotropic polymeric gel in said bottom end of said tube, and a spray coated anticoagulant formulation having characteristics that minimize interference with nucleic acid testing comprising a mixture of water, and ethylenediaminetetraacetic acid dipotassium salt dihydrate, at a concentration of about 0.2M to about 1.0M and a pH of about 5.6 to about 6.2, located on said inner surface of said tube.

2. A method for making a tube for preparing a plasma specimen for diagnostic assays comprising the steps of:

a. depositing a gel into the closed end of the tube;

b. preparing an anticoagulant formulation comprising a mixture of and water, ethylenediaminetetraacetic acid dipotassium salt dihydrate at a concentration from about 0.2M to about 1.0M and a pH from about 5.6 to about 6.2;

c. dispersing said formulation on the inner wall of said tube in a fine mist above said gel; and d. drying said formulation by applying forced air for a sufficient period of time to dry the formulation whereby a dry formulation remains.

3. The method of claim 2, wherein said gel is a thixotropic polymeric gel.

* * * * *